United States Patent
Eriksson Löwenmark et al.

(10) Patent No.: US 10,159,077 B2
(45) Date of Patent: Dec. 18, 2018

(54) METHODS AND ARRANGEMENTS RELATING TO SENDING INFORMATION REPEATEDLY FROM A SENDING NODE TO A RECEIVING NODE IN A CELL OF A WIRELESS COMMUNICATION NETWORK

(71) Applicant: Telefonaktiebolaget LM Ericsson (publ), Stockholm (SE)

(72) Inventors: Stefan Eriksson Löwenmark, Färentuna (SE); Gustav Almquist, Järfälla (SE); Olof Liberg, Stockholm (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 9 days.

(21) Appl. No.: 15/036,710

(22) PCT Filed: Apr. 12, 2016

(86) PCT No.: PCT/SE2016/050305
§ 371 (c)(1),
(2) Date: May 13, 2016

(87) PCT Pub. No.: WO2016/167707
PCT Pub. Date: Oct. 20, 2016

(65) Prior Publication Data
US 2017/0127422 A1 May 4, 2017

Related U.S. Application Data

(60) Provisional application No. 62/147,007, filed on Apr. 14, 2015.

(51) Int. Cl.
*H04W 72/04* (2009.01)
*H04L 1/08* (2006.01)
(Continued)

(52) U.S. Cl.
CPC .......... *H04W 72/0466* (2013.01); *H04B 7/14* (2013.01); *H04J 3/22* (2013.01);
(Continued)

(58) Field of Classification Search
CPC . H04W 72/0466; H04W 72/0446; H04J 3/22; H04L 5/0073; H04L 25/03866; H04L 1/08; H04L 1/1819; H04L 1/1896
See application file for complete search history.

(56) References Cited

U.S. PATENT DOCUMENTS

2003/0039229 A1* 2/2003 Ostman ................. H04L 1/0001
370/335
2003/0122711 A1* 7/2003 Panasik ................ G01C 21/206
342/387

(Continued)

FOREIGN PATENT DOCUMENTS

WO WO 2012/047140 A1 4/2012
WO WO 2013/158005 A1 10/2013

OTHER PUBLICATIONS

3GPP, Technical Report—"3rd Generation Partnership Project; Technical Specification Group Radio Access Network; Study on provision of low-cost Machine-Type Communications (MTC) User Equipments (UEs) based on LTE (Release 12)", 3GPP TR 36.888 V12.0.0 (Jun. 2013), 55 pp.

(Continued)

*Primary Examiner* — Kibrom T Hailu
(74) *Attorney, Agent, or Firm* — Sage Patent Group

(57) ABSTRACT

A sending node sends information to a receiving node. Said nodes are comprised in a wireless communication network. Communication between said nodes is associated with a first cell. The sending node obtains predefined scrambling for scrambling the information and which predefined scrambling is specific for the first cell. The receiving node correspondingly obtains de-scrambling. The sending node (Continued)

sends, to the receiving node, the information repeatedly a certain number of times, wherein each time the information is sent it is scrambled differently based on the obtained scrambling. Each time the information is received by the receiving node it is de-scrambled differently based on the obtained de-scrambling.

24 Claims, 6 Drawing Sheets

(51) Int. Cl.
    *H04L 25/03*     (2006.01)
    *H04B 7/14*     (2006.01)
    *H04J 3/22*     (2006.01)
    *H04L 5/00*     (2006.01)

(52) U.S. Cl.
    CPC .............. *H04L 1/08* (2013.01); *H04L 5/0073* (2013.01); *H04L 25/03866* (2013.01); *H04W 72/0446* (2013.01)

(56) References Cited

U.S. PATENT DOCUMENTS

| | | | |
|---|---|---|---|
| 2009/0303972 A1* | 12/2009 | Flammer, III | H04B 1/7143 370/338 |
| 2011/0007728 A1 | 1/2011 | Jading et al. | |
| 2011/0261801 A1* | 10/2011 | Powell | H04B 1/707 370/338 |
| 2013/0039284 A1* | 2/2013 | Marinier | H04L 5/001 370/329 |
| 2013/0044728 A1* | 2/2013 | Guo | H04L 1/0026 370/330 |
| 2013/0279485 A1 | 10/2013 | Gao et al. | |
| 2015/0263832 A1* | 9/2015 | Takeda | H04J 11/0053 370/329 |

OTHER PUBLICATIONS

3GPP, Technical Specification—"3rd Generation Partnership Project; Technical Specification Group GSM/EDGE Radio Access Network; Radio transmission and reception (Release 12)", 3GPP TS 45.005 V12.0.0 (Aug. 2013), 266 pp.

3GPP, Technical Specification—"3rd Generation Partnership Project; Technical Specification Group GSM/EDGE Radio Access Network; Cellular System Support for Ultra Low Complexity and Low Throughput Internet of Things; (Release 13)", 3GPP TR 45.820 V1.0.0 (Mar. 2015), 164 pp.

International Search Report, PCT Application No. PCT/SE2016/050305, dated Jul. 14, 2016.

Written Opinion of the International Searching Authority, PCT Application No. PCT/SE2016/050305, dated Jul. 14, 2016.

3GPP, Technical Specification—"3rd Generation Partnership Project; Technical Specification Group Radio Access Network; Evolved Universal Terrestrial Radio Access (E-UTRA); Physical Channels and Modulation (Release 9)", 3GPP TS 36.211 V9.0.0 (Dec. 2009), 85 pp.

Motorola, "UCI Multiplexing on PUSCH in UL-MIMO", Agenda item: 6.4.2, Document for Discussion, 3GPP TSG RAN1#62bis, R1-105612, Xi'an, People's Republic of China, Oct. 11-15, 2010.

* cited by examiner

← Wanted signal in own cell
←-- Interfering signal reaching other cell

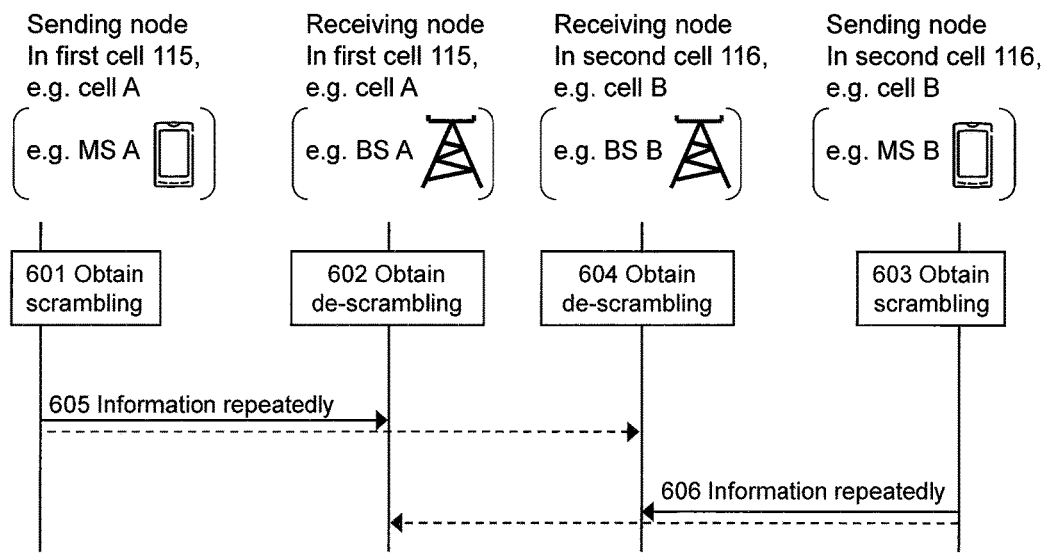

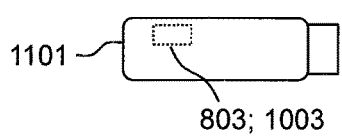
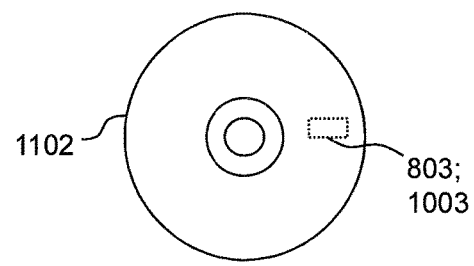
Fig. 11a          Fig. 11b
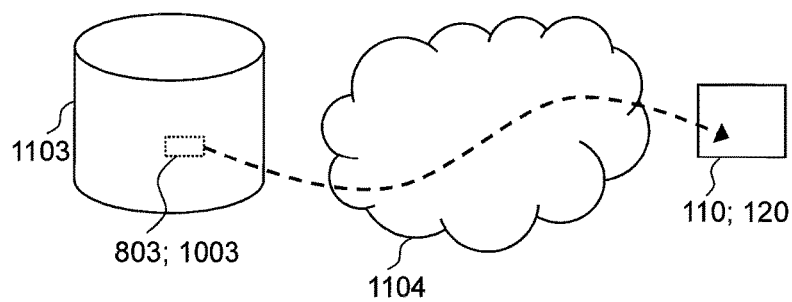
Fig. 11c

METHODS AND ARRANGEMENTS RELATING TO SENDING INFORMATION REPEATEDLY FROM A SENDING NODE TO A RECEIVING NODE IN A CELL OF A WIRELESS COMMUNICATION NETWORK

CROSS REFERENCE TO RELATED APPLICATIONS

This application is a 35 U.S.C. § 371 national stage application of PCT International Application No. PCT/SE2016/050305, filed on Apr. 12, 2016, which itself claims the benefit of U.S. Provisional Application No. 62/147,007, filed Apr. 14, 2015, the disclosure and content of both of which are incorporated by reference herein in their entireties.

TECHNICAL FIELD

Embodiments herein relate to a sending node and a receiving node, e.g. a radio network node and/or a wireless device, of a wireless communication network, such as a telecommunications network, that e.g. may be a GSM network. In particular embodiments herein relate to communication between the sending node and the receiving node in a cell of the wireless communication network, which communication involves repeatedly sending the same information, e.g. by means of block repetition, from the sending node to the receiving node.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a cellular communication network, wireless communication system, or radio communication system, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

The expression downlink (DL) is used for the transmission path from the base station to the wireless device. The expression uplink (UL) is used for the transmission path in the opposite direction i.e. from the wireless device to the base station.

Existing radio access technologies deploy different multiplexing/multiple access schemes to divide the radio spectrum among multiple users. For example in GSM, TDMA (Time Division Multiple Access) and FDMA (Frequency Division Multiple Access) are used, while TDMA and OFDMA (Orthogonal Frequency Division Multiple Access) are used in LTE.

When the multiplexing scheme has a TDMA component, the transmitted signal is divided in blocks, transmitted sequentially in time on e.g. the same radio frequency channel. Multiplexing is provided by alternating between blocks to different receivers.

On most radio channels, the transmitted signal is distorted by the channel propagation before it reaches the receiver. The channel may e.g. add time dispersion and attenuation. Typically, the impact varies with time due to e.g. movement of the transmitter and/or receiver. In addition, the transmitter and receiver may themselves introduce random changes in the phase of the signal from one block to the next.

In some situations, e.g. when the transmitter and receiver are stationary, the channel variations are very slow or even non-existent. In such scenarios, a well-known technique to increase the coverage is to use block repetition on the transmitter side and coherent accumulation of multiple received signal samples on the receiver side. Block repetition means that the same information is being sent multiple times, i.e. repeatedly. A pre-requisite for coherent combining is also that the phase of the transmitted blocks is the same or changes in a known way.

With block repetition, the SNR (signal-to-noise ratio) after coherent combining will increase as $10*\log_{10}(N)$, where N is the number of repetitions. This can be understood as follows:

The bursts of the wanted signal will be added coherently, meaning that the amplitudes of the signal samples will be added. If N bursts are added, the amplitude will increase N times, and consequently, the energy of the wanted signal will increase by a factor $N^2$.

The noise samples of each burst will also be added, but assuming that the noise samples are independent, they will not be added coherently. Addition of independent variables means that the variance of the sum equals the sum of the individual variances. Therefore the variance, and hence the energy, of the noise will increase by a factor N.

Consequently, the SNR will increase by a factor $N^2/N=N$, or $10*\log_{10}(N)$ if expressed in dB.

Block repetition has been proposed for example in LTE and GSM in order to achieve coverage increases of up to 15-20 dB for Machine Type Communications (MTC), see e.g. 3GPP TR 36.888 v12.0.0 "Study on provision of low-cost Machine-Type Communications (MTC) User Equipments (UEs) based on LTE", and 3GPP TR45.820 v1.0.0 (GP-150317).

While block repetition increases the effective SNR in a noise-limited scenario, it will not increase the effective SIR (signal-to-interference ratio) to the same extent in case the link is interfered by an interferer that also uses coherent burst repetitions, since the interference samples will also add up coherently. Therefore, the interference energy will increase by a factor $N^2$, just as the wanted signal, and the carrier-to-interference ratio will not increase by the use of burst repetitions. If the interferer uses a different repetition interval, and/or has a time offset relative to the wanted signal, the interferer will in part be added coherently and in part non-coherently, and the interferer energy amplification will be somewhere in between N and $N^2$. In general, the gain of repetitions will be less when subject to interference than to noise.

SUMMARY

It is an object to alleviate or a least reduce any or all of the above mentioned problems and/or for example, provide improvements regarding reducing impact of inter-cell interference, i.e. interference from other cells, e.g. from wireless devices and/or base stations operating in said other cells.

According to a first aspect of embodiments herein, the object is achieved by a method, performed by a sending node, for sending information to a receiving node. Said nodes are comprised in a wireless communication network and communication between said nodes is associated with a first cell of the wireless communication network. The receiving node obtains predefined scrambling for scrambling the information and which predefined scrambling is specific for the first cell. The sending node sends, to the receiving node, the information repeatedly a certain number of times, wherein each time the information is sent it is scrambled differently based on the obtained scrambling.

According to a second aspect of embodiments herein, the object is achieved by a computer program comprising instructions that when executed by a processing circuit causes the sending node according to the first aspect to perform the method.

According to a third aspect of embodiments herein, the object is achieved by a data carrier comprising the computer according to the second aspect.

According to a fourth aspect of embodiments herein, the object is achieved by a method, performed by a receiving node, for receiving information from a sending node. Said nodes are comprised in a wireless communication network and communication between said nodes is associated with, a first cell of the wireless communication network. The receiving node obtains predefined de-scrambling, for de-scrambling the information and which predefined de-scrambling is specific for the first cell. The receiving node receives, from the sending node, the information repeatedly a certain number of times, wherein each time the information is received it is de-scrambled differently based on the obtained de-scrambling.

According to a fifth aspect of embodiments herein, the object is achieved by a computer program comprising instructions that when executed by a processing circuit causes the receiving node according to the fourth aspect to perform the method.

According to a sixth aspect of embodiments herein, the object is achieved by a data carrier comprising the computer program according to the fifth aspect.

According to a seventh aspect of embodiments herein, the object is achieved by a sending node for sending information to a receiving node when said nodes are comprised in a wireless communication network and communication between said nodes is associated with a first cell of the wireless communication network. The sending node is configured to obtain predefined scrambling for scrambling the information and which predefined scrambling is specific for the first cell. The sending node is further configured to send, to the receiving node, the information repeatedly a certain number of times, wherein each time the information is sent it is scrambled differently based on the obtained scrambling.

According to an eight aspect of embodiments herein, the object is achieved by a receiving node for receiving information from a sending node when said nodes are comprised in a wireless communication network and communication between said nodes is associated with a first cell of the wireless communication network. The receiving node is configured to obtain predefined de-scrambling for de-scrambling the information and which predefined de-scrambling is specific for the first cell. The receiving node is further configured to receive, from the sending node, the information repeatedly a certain number of times, wherein each time the information is received it is de-scrambled differently based on the obtained de-scrambling.

Thanks to embodiments herein and cell specific scrambling and descrambling, different scrambling, such as corresponding to different overlaid scrambling codes, may be applied on wanted and interfering signals, e.g. bursts, comprising, the information to be communicated. Wanted information or signals, e.g. bursts; may thereby be coherently combined while at the same time interfering signals, e.g. bursts, such as from other cell(s), can be non-coherently combined, whereby impact of the interfering signals is reduced. Consequently, embodiments herein enable improvement of a Signal to Noise Ratio (SNR) compared to if information, e.g., by conventional block repetition, would be repeatedly sent in a conventional manner without the above described scrambling.

Further, implementation complexity of embodiments herein is small. Thus, embodiments herein may be comparatively easily implemented in existing, such as legacy, wireless communication networks, nodes and devices.

BRIEF DESCRIPTION OF THE DRAWINGS

The various aspects of embodiments disclosed herein, including particular features and advantages thereof, will be readily understood from the following detailed description and the accompanying schematic drawings, which are briefly described in the following.

FIG. 5 is an example schematically showing how signals received according to embodiments herein may be descrambled.

FIG. 6 is a combined signaling diagram and flowchart for describing embodiments herein.

FIGS. 11a-c are schematic drawings illustrating embodiments relating to data carriers and computer programs.

DETAILED DESCRIPTION

Figure 1:
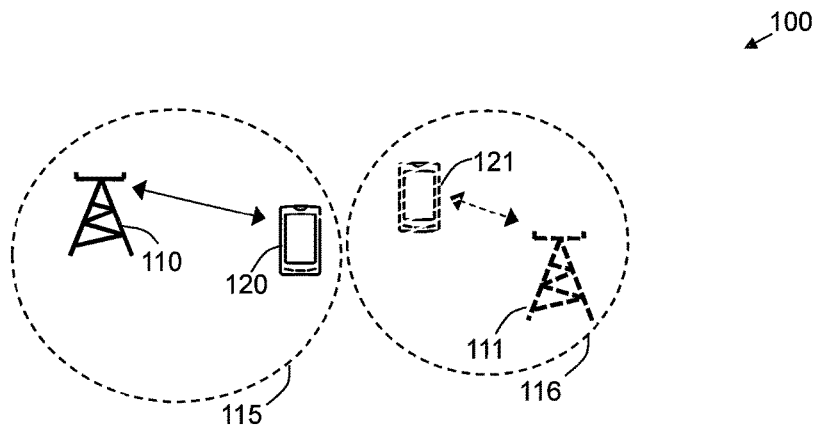
FIG. 1 is a block diagram schematically depicting an example of a wireless communication network in which embodiments herein may be implemented.

Throughout the following description similar reference numerals may be used to denote similar elements, units, modules, circuits, nodes, parts, items or features, when applicable.

The air interface in wireless communication networks, e.g. cellular systems, such as GSM, WCDMA and LTE rely on TDMA in order to divide and allocate time among users, or in other words among wireless devices, of the system. In addition to TDMA, other multiplexing techniques are used. For example GSM employs also FDMA, LTE employs also OFDMA, while WCDMA employs CDMA. The TDMA structure provides a frame structure in time, which is used to assign radio resources to the users. The time resources are divided into basic units, which are grouped into larger units, and these larger units may in turn be grouped into even larger units, and so on. For example in GSM the basic division of time is called a time slot (TS), and 8 consecutive time slots are grouped into one TDMA frame. In LTE there are also time slots, two time slots are grouped into one sub-frame, and 10 sub-frames constitute one frame.

FIG. 1 is a schematic block diagram schematically depicting an example of a wireless communication network 100 in which embodiments herein may be implemented. The wireless communication network 100 is typically a telecommunication system, such as a cellular communication network, e.g. a GSM, or GSM-based, wireless communication network.

The wireless communication network 100 comprises a first network node 110, e.g. a radio network node such as base station or a Base Station Subsystem (BSS) or part thereof. The wireless communication network 100 further comprises a first cell 115, indicated in the figure by a perimeter of its coverage area. The first cell 115, or at least radio coverage thereof, is provided by the first network node 110. A first wireless device 120 shown in the figure may be served in the wireless communication network 100, e.g. in the first cell 115 by the first network node 110. Communication in the uplink and/or downlink between the first wireless device 120 and the first radio network node is associated with, e.g. is being performed in, the first cell 115.

The wireless communication network 100 may comprise a second network node 111, e.g. another radio network node such as another base station or a another BSS or part thereof. The wireless communication network 100 may further comprises a second cell 116, indicated in the figure by a perimeter of its coverage area. The second cell 116, or at least radio coverage thereof, is provided by the second network node 110. A second wireless device 121 shown in the figure may be served in the wireless communication network 100, e.g. in the second cell 116 by the second network node 111. Communication in the uplink and/or downlink between the second wireless device 121 and the second radio network node 111 is associated with, e.g. is being performed in, the second cell 116. The second cell 116 is an example of a cell, as discussed above, which may cause inter-cell interference in the first cell 115. For example, communication in the second cell 116, e.g. in the uplink and/or downlink between the second wireless device 121 and the second network node 111, may cause interference disturbing communication in the first cell 115, e.g. in the uplink and/or downlink between the first wireless device 120 and the first network node 110.

Embodiments herein may apply to in principle any wireless communication network or communication system where interference is created between different users in the system. Furthermore, the network should preferably make use of what is here referred to as block repetition or similar, i.e. that a connection transmits the same information or signal multiple times. Embodiments herein may for example be applied to a wireless communication network with an air interface based on, e.g. that possess, a frame structure where signals are transmitted in multiple frames in repeated transmissions, which may be referred to as block repetition. As is realized, the wireless communication network 100 may be such network mentioned in this paragraph.

Attention is drawn to that FIG. 1 is only schematic and for exemplifying purpose and that not everything shown in the figure is required for all embodiments herein, as will be evident to the skilled person based on what is disclosed herein. Also, a wireless communication network that in reality corresponds to the wireless communication network 100 typically comprises several further network nodes, base stations, cells etc., as realized by the skilled person, but which are not shown herein for the sake of simplifying.

Figure 2:
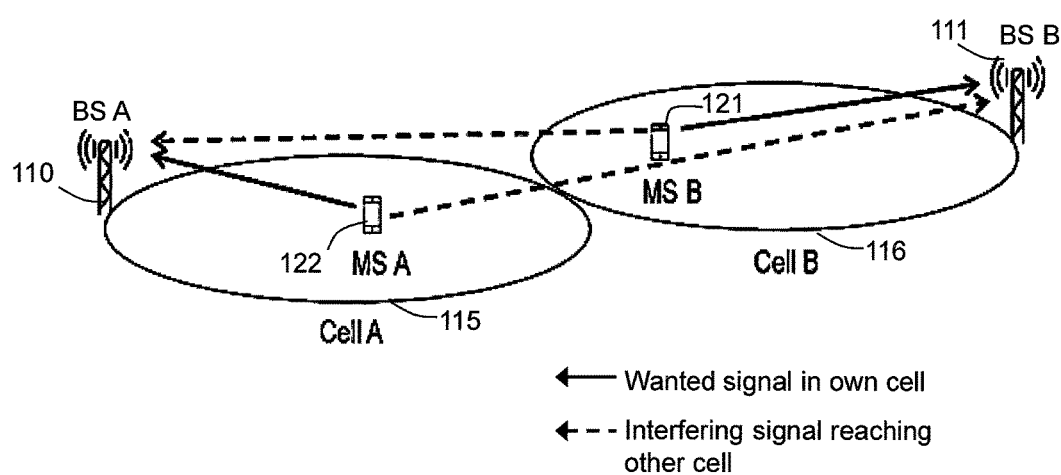
FIG. 2 is a block diagram schematically depicting the wireless communication network in a specific situation with interfering signals.

FIG. 2 is a block diagram schematically depicting the wireless communication network 100 and illustrates a specific situation that will be used both for further explaining the background and embodiments herein. The figure is schematically depicting signals corresponding to repeatedly sending the same information under influence of inter-cell interference.

Two cells A and B are shown, corresponding to cells 115, 116, respectively. In the figure, and in coming examples, denotations A and B are being used to make association with respective cell more direct and thereby facilitate understanding. Hence, in the figure a wireless device MS A, corresponding to the wireless device 120, is connected to the cell A and a wireless device MS B, corresponding to the wireless device 121, is connected to cell B. MS A may thus be served in cell A by a BS A being a radio network node providing cell A, e.g. a base station, and corresponding to the first network node 110. MS B may be served in cell B by a BS B being a radio network node providing cell B, e.g. a base station, corresponding to the second network node 111. The radio network nodes may by different or the same. Only the uplink (UL) direction for MS A is considered in the figure and in examples discussed next but attention is drawn to that embodiments herein, discussed in the following, may correspondingly or equally apply to also to the downlink (DL). Hence, in the situation with the UL signals shown in the figure, MS A is an example of a sending node and BS A is an example of a receiving node. In another situation in the DL, the BS A would be an example of a sending node and MS A would be an example of a receiving node.

In general, the present disclosure may be considered to encompass two groups of embodiments. In a first group of embodiments, the first wireless device 120, such as MS A; is an example, of a sending node as will be further discussed herein, and the first network node 110, such as BS A, is example of a receiving node as also will be further discussed herein. In the first group of embodiments, sending and receiving of information thus is taking part in the uplink. In a second group of embodiments; the first network node 110, such as BS A, is example of the sending node, and the first wireless device 120, such as MS A, is example of the receiving node. In the second group of embodiments, sending and receiving of information thus is taking part in the downlink.

It should be noted that the first group of embodiments is compatible with and may be implemented simultaneously with the second group of embodiments, which e.g. is the case when embodiments herein are implemented in both the uplink and the downlink.

Figure 3:
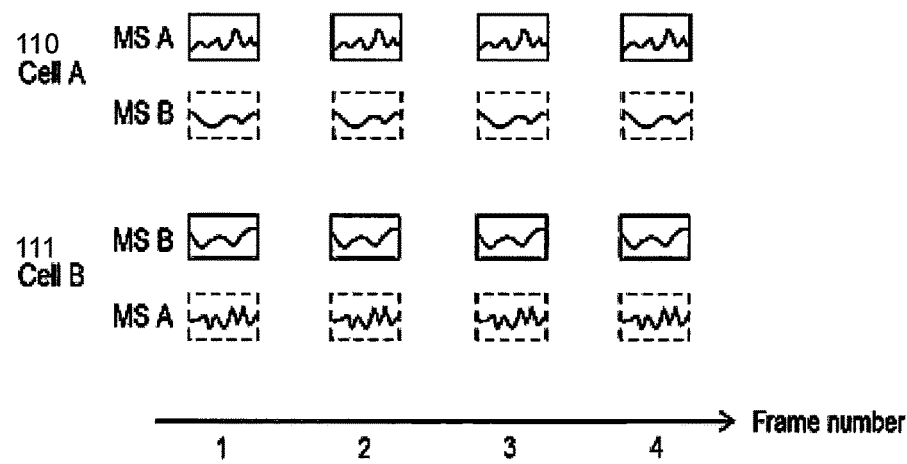
FIG. 3 is a prior art example schematically showing, presence of interfering signals as in FIG. 2.

FIG. 3 is an example with wanted and interfering signals as shown in FIG. 2 and discussed in the foregoing paragraph. Each transmitted signal in a serving cell will be experienced as an interfering signal by neighboring cells. In the shown example, each user, here represented by MS A and MS B, repeats, the same signal in four consecutive frames, and the users are aligned in time such that a first frame, named frame 1 in the figure; of MS A overlaps with frame 1 of MS B etc. The principle is the same even if the repetition is not per frame; it may e.g. be per block or burst.

Conventionally, i.e. without embodiments herein, identical signals are transmitted in each repetition, which in other words may be expressed as the same information is sent repeatedly by identical or substantially identical signals. At the receiver side, e.g. at the first network node 110 in view of the example shown in FIG. 3, when these signals are accumulated, both carrier and interferer are coherently accumulated, effectively leaving the experienced signal-to-noise ratio unchanged as discussed in Background. This problem applies to both cell A and cell B in the UL as should be, understood, although the situation illustrated in FIG. 1 focuses on cell A. When block repetition is applied in a noise limited scenario, the SNR (signal-to-noise ratio) after coherent combining will increase as $10*\log_{10}(N)$, where N is the number of repetitions. As explained in the Background, the gain will be less when subject to interference that also uses block repetitions.

An idea underlying embodiments herein is to apply an overlaid scrambling, such as a scrambling sequence or code, to each transmission.

Figure 4:
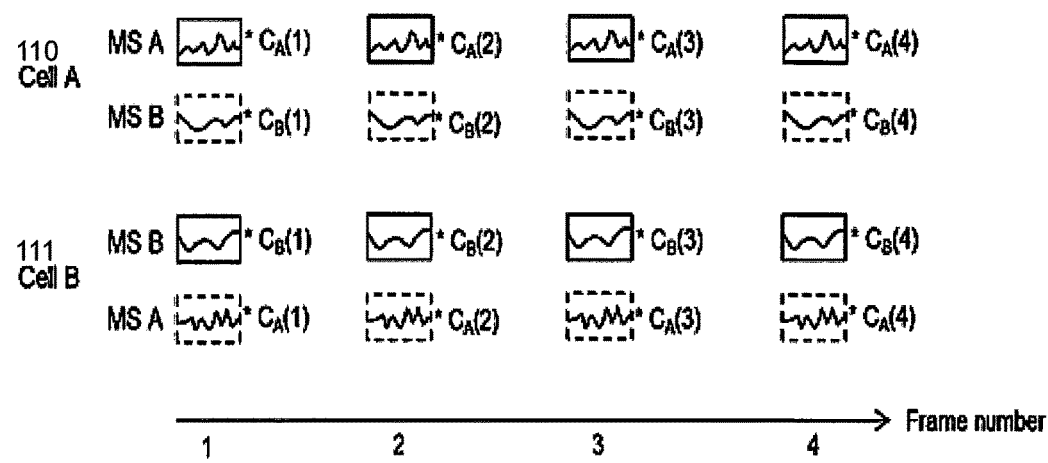
FIG. 4 is an example schematically showing presence of interfering signals as in FIG. 2 and how embodiments herein may affect signals.

FIG. 4 is another example with wanted and interfering signals as illustrated in FIG. 2, which is to be compared with the example of FIG. 3 but shows how embodiments herein may affect the signals. With embodiments herein, e.g. a specific and different phase shift is applied to each frame, and generally different phase shifts are applied in different cells. As a result, non-identical signals may be transmitted in each repetition, which, in other words, may be expressed as the same information is sent repeatedly by non-identical signals.

Each cell k, e.g. each one of cell A and B, may be assigned a cell-specific scrambling code or sequence $C_k(n)$, $n=0, \ldots, L-1$, which is a sequence of length L of complex, or real, numbers with unit amplitude representing for example phase shifts, or symbol rotations. The scrambling codes, e.g. values of scrambling sequence, may e.g. be according to pseudo-random sequences that may be known to e.g. a BSS, such as BS A, and wireless devices, such as MS A, being served by the BSS. The sequences may be designed to have low cross-correlation.

On a transmitter side, e.g. at MS A, a sequence of transmitted bursts may be scrambled according to the scrambling code or sequence specific for, and e.g. assigned to, the cell that the transmitter operates in, as is illustrated in FIG. 3. For example, if a burst is transmitted in timeslot TN of TDMA frame FN, the burst may be phase shifted, or symbol rotated, with the phase/rotation angle represented by $C_k((FN*8+TN) \bmod L)$, i.e. for MS A, with k=A, $C_A((FN*8+TN) \bmod L)$. Hence, which value of a scrambling sequence $C_k(n)$, $n=0, \ldots, L-1$ to be used may be determined by $(FN*8+TN) \bmod L$, or in other words, here $(FN*8+TN) \bmod L$, and thus indirectly the frame number FN and the timeslot number TN, identifies which value of the cell specific scrambling sequence $C_k(n)$, i.e. which scrambling code, that will be used for the scrambling. The frame number FN and timeslot number TN are known also at the receiver side, in the illustrated example to BS A, and can thus be used by the receiver side to identify the value that was used for scrambling and thus use this value for descrambling.

Hence, on a receiver side, e.g., cell A and BS A, a sequence of received bursts may be de-scrambled according to the scrambling code or sequence specific for, and e.g. assigned to, the cell that the receiver operates in, which cell thus typically corresponds to the cell that the bursts were received in. If a burst is received in timeslot TN of a TDMA frame FN, the burst may be phase shifted, or symbol (de-)rotated, with a phase/rotation angle represented by $C^*_k((FN*8+TN) \bmod L)$, where * denotes complex conjugation of the value of a sequence determined, or identified, by (FN*8+TN) mod L). Note that symbol de-rotation with angle (x) is equivalent to symbol rotation with angle (x*).

Within the cell, e.g. cell A, a coherency of received bursts is not affected by this, since the phase shifts and symbol rotations of the transmitter are reversed by the receiver before combining.

Inter-cell interferers, i.e. interference from another cell, e.g. from MSB in cell B, however, should, as realized from the above, be scrambled by another cell-specific, different overlaid scrambling code than the wanted signals. Therefore, their addition will be non-coherent.

Please note that the value used in the above example to index the scrambling code, (FN*8+TN) mod L, and that thus identifies a scrambling value of the sequence, is merely an example. E.g., the value 8, corresponding to the number of slots in the GSM TDMA frame, should be replaced by a different value in a system with a different TDMA frame length. In a more generic form where e.g. a network or system is considered and, that is not based on TDMA, the cell specific scrambling may be expressed as $C_k(FN)$ mod L. Other ways to index the scrambling code may also be envisaged, not directly based on FN and TN. For instance, the indexing could be based on the order in which the bursts are transmitted.

FIG. 5 is schematically depicting signals corresponding to repeatedly receiving the same information scrambled according to embodiments herein and how the signals, including inter-cell interference, may be descrambled. The illustration of FIG. 5 only focuses on the reception of MS A in cell A and can be considered as a continuation of the above discussion in relation to FIGS. 2-4.

The receiving node, e.g. network node of cell A, such as BS A, may de-scramble received frames and by that cancel out the scrambling, e.g. phase shifts, applied by the sending node, here MS A. Hence the illustrated four frames of MS A may be accumulated coherently and add up to 4 times the amplitude of a single transmission. For interfering frames from e.g. MS B, that thus may be scrambled using another cell specific scrambling code for cell B, the de-scrambling result in a factor lower than 4 as long as the cell specific codes are not chosen identically, but this thus can and should be avoided by said cell specific scrambling. By this the experienced ratio carrier-to-interferer, C/I, is increased, or at least increase is enabled, compared to if embodiments herein are not applied, i.e. without applying the cell specific scrambling.

Embodiments herein may be described as attempting to secure that processing gains achievable in e.g. a sensitivity limited scenario for a technique relying on block repetition on the transmitter side and coherent accumulation at the receiver side, is also feasible in an interference limited scenario. This is achieved by applying cell-specific scrambling codes or sequences that may be considered overlaid to the transmitted signals.

FIG. 6 is a combined signalling diagram and flowchart for describing embodiments herein following the examples discussed above in connection with FIGS. 2-5. The cells and nodes involved are:

the first cell 115, corresponding to cell A in the foregoing examples, the second cell 116, corresponding to cell B in the foregoing examples, a sending node of the first cell 115, corresponding to the transmitter side mentioned above, that thus for sending in the UL may correspond to the first wireless device 120, such as MS A, and for sending in the DL may correspond to the first network node 110, such as BS A, a receiving node of the first cell 115, corresponding to the receiver side mentioned above, that thus for receiving in the UL may correspond to the first network node 110, such as BS A, and for receiving in the DL may correspond to the first wireless device 120, such as MS A, a sending node of the second cell 116, which thus for sending in the UL may correspond to the second wireless device 121, such as MS B, and for sending in the DL may correspond to the second network node 111, such as BS B.

a receiving node of the second cell 116, which thus for receiving in the UL may correspond to the second network node 111, such as BS B, and for receiving in the DL may correspond to the second wireless device 121, such as MS B.

Note that, as already indicated above, although the examples in the figure corresponds to the examples for the UL as discussed in connection with FIG. 2-5, embodiments herein are also applicable in the DL with e.g. interference at MS A where BS A provides a wanted signal and BS B provides an interfering signal. Hence, sending node or transmitter side, receiving node or receiver side, etc although a bit more abstract are appropriate to use for describing embodiments herein since these expressions are applicable independent on UL and DL.

As also should be realized from the above, it is of course so that at the same time e.g. MS A may provide a wanted signal in the uplink to cell A and BS A, the same signal is an interfering signal in the uplink to cell B and BS B.

Exemplary actions indicated in FIG. 6 will now be described. Note that the actions may be executed in any suitable order.

Action 601

The sending node of the first cell 115, in case of the UL e.g. MS A of cell A, obtains predefined, e.g. predetermined, scrambling, e.g. a scrambling algorithm or scheme, specific for the first cell 115, e.g. cell A. The scrambling is for scrambling information to be sent to the receiving node, in case of the UL e.g. to BS A, such as in Action 605 below.

The scrambling specific for the first cell 115, e.g. cell A, should be different from scrambling specific for the second cell 116, e.g. cell B, which, as explained above, may cause inter-cell interference in the first cell 115. In some embodiments, the scrambling may be different for each cell in the wireless communication network 100, or may at least be different among all closest neighboring cells to the first cell 115, or may at least be different for all other cells within a certain distance from the first cell 115.

In some embodiments, the scrambling is or comprises a sequence of predefined scrambling values. The sequence may be of a certain length, e.g. a length L where L is an integer, and be specific for said cell and each time the information is repeatedly sent it may be scrambled by a different scrambling value of the sequence. Hence, with reference to the above mentioning that the predefined scrambling may be a scheme, such scrambling scheme may be in the form of said predefined scrambling values that may correspond to what is referred to as a scrambling code or sequence elsewhere in the present disclosure.

The predefined scrambling may e.g. result from that each cell k of the wireless communication network 100, including cell A and B, may be assigned a cell-specific scrambling code $C_k(n)$, n=0, ..., L-1, which is a sequence of length L.

The scrambling, e.g. $C_k$, may be based on, such as be or comprise one or more of the following:

Complex (or real) numbers with unit amplitude representing phase shifts.

Complex numbers with unit amplitude representing sample rotation, effectively giving rise to a known frequency offset of a signal it is applied to, also referred to as symbol rotation.

Intentional time variations in the transmission time.

Signal "flipping", i.e. changing the order in which the samples are transmitted, from last to first, instead of first to last.

In further examples herein, only phase shift and symbol rotation are further considered in some detail, but other aspects of cell specific changes within block repetition is not excluded for embodiments herein.

The scrambling codes may e.g. be pseudo-random sequences that are known to involved sending and receiving nodes, e.g. radio network nodes, such as BSS, and wireless devices. The sequences may be designed to have low cross-correlation.

Action 602

The receiving node of the first cell 115, in case of the UL e.g. BS A of cell A, obtains predefined, e.g. predetermined, de-scrambling, e.g. a de-scrambling algorithm or scheme, specific for the first cell 116, e.g. cell A. The de-scrambling is for de-scrambling information to be, received, from the sending node of the first cell 115, by the receiving node of the first cell 115, see e.g. Action 605 below.

The de-scrambling is preferably obtained based on, e.g. by reversing, said predefined, e.g. predetermined, scrambling specific for the cell, which scrambling was or will be used for scrambling the information. The de-scrambling may be based on scrambling using complex conjugates of the scrambling values.

The de-scrambling and/or scrambling are typically fully or partly known in advance by the receiving node. The de-scrambling and/or scrambling may be identified by the receiving node based on an identity of the first cell 115.

Action 603

The sending node of the second cell 116, in case of the UL e.g. MS B of cell B, may obtain predefined, e.g. predetermined, scrambling, e.g. a scrambling algorithm or scheme, specific for the second cell 116, e.g. cell B.

As should be realized, this action may correspond to Action 601 but here instead relating to the sending node of the second cell 116 instead of the first cell 115. However, note that the obtained scrambling is specific for respective cell and should be different for the first cell 115 and the second cell 116.

Action 604

The receiving node of the second cell 116, in case of the UL e.g. BS B of cell B, may obtain predefined, e.g. predetermined, de-scrambling, e.g. a de-scrambling algorithm or scheme, specific for the second cell 116, e.g. cell B. The de-scrambling is for de-scrambling information to be received from the sending node of the second cell 116 by the receiving node of the second cell 116, such as in Action 606 below.

As should be realized, this action may correspond to Action 602 but here instead relating to the receiving node of the second cell 116 instead of the first cell 115.

Action 605

The sending node of the first cell 115 sends, to the receiving node of the first cell 115, information repeatedly a certain number of times, or in other words, the same information is sent multiple times, e.g. by so called block repetition. The receiving node of the first cell 115 receives the information repeatedly said certain number of times, or in other words, the same information is received multiple times. Each time the information is repeatedly received it is de-scrambled differently based on the obtained de-scrambling. That is, after multiple receipt the scrambled information, the information is de-scrambled. For example, each time the information is sent it may be scrambled different than the time before, but the de-scrambling will then still result in the same information and thus e.g. multiple copies of it, such as 4 copies, as explained and exemplified above and in the context of FIG. 5.

Further, as also explained above, when the receiving node of the first cell 115 receives the scrambled information repeatedly from the sending node of the first cell 115 it may at the same time receive inter-cell interference from the sending node of the second cell 116, such as resulting from Action 606 described below and schematically illustrated in FIG. 6 by the dotted arrow from the sending node of the second cell 116 reaching the receiving node of the first ell 115. Correspondingly, the information being repeatedly sent in the present action may cause inter-cell interference in the second cell 116, e.g. as illustrated by the doted arrow from the sending node of the first cell 155 reaching the receiving node of the second cell 116.

However, thanks to that the scrambling and de-scrambling is cell specific, it is possible, as also s explained and exemplified above and in the context of FIG. 5, to suppress the impact from the inter-cell interference by avoiding coherent addition.

Each time the information is repeatedly sent by the sending node and/or received by the receiving node it may be identified by a different identifier and scrambled by a scrambling value of the sequence, which scrambling value is determined by the identifier. The identifier may be a frame number, a Time Division Multiple Access (TDMA) frame number and/or a timeslot number of a frame, e.g. of a TDMA frame.

The sequence of predefined scrambling values is preferably a pseudo-random sequence. As used herein, pseudo-random sequence refers to that the values of the sequence appear to be random but are not. Pseudorandom sequences typically exhibit statistical randomness but may be generated by an entirely deterministic causal process.

The scrambling values may be real and/or complex numbers.

In some embodiments, the scrambling provides different phase shifts each time the information is repeatedly sent. E.g. phase shifting with phases according to the scrambling values. The scrambling values may be complex or real numbers with unit amplitude representing phase shifts.

In some embodiments, the scrambling provides different sample and/or symbol rotations each time the information is repeatedly sent. E.g. sample and/or symbol rotation with rotations angles according to the scrambling values. The scrambling values may be complex or real numbers with unit amplitude representing sample rotation, thereby effectively giving rise to a known frequency offset of the signal, which also may be referred to as symbol rotation.

In some embodiments, the scrambling provides time variations in the transmission time.

In some embodiments, the scrambling provides a change in the order in which samples of the information are sent each time the information is repeatedly sent. This may be named signal "flipping". E.g. the change in order may be from last to first instead of first to last.

Action 606

As should be realized, this action may correspond to Action 605 but here instead relating to the sending node and the receiving mode of the second cell 116 instead of the first cell 115 as in action 605. As already explained above under Action 605, the sending node of the second cell 116 may cause inter-cell interference in the first cell when information is repeatedly sent in the second cell 116. Note, as should be understood, that the information being repeatedly sent in the second cell in the present action is typically independent from and different than the information being repeatedly sent in the first cell 115 in Action 605. The information being repeatedly sent in the respective cell should also be scrambled differently, as enabled by the cell specific scrambling, and thus also de-scrambled differently, as also has been discussed in the foregoing.

Hence, in view of the above and according to embodiments herein, on a transmitter side, such as in the sending node of the first cell 115, a sequence of transmitted bursts, being examples of information being sent repeatedly as in Action 605, may be scrambled according to a scrambling code specific for, e.g. assigned, to a cell, e.g. the first cell 115. Each cell k, e.g. each one of cell A and B, may be assigned a cell-specific scrambling code or sequence $C_k(n)$, $n=0, \ldots, L-1$, which is a sequence of length L of complex, or real, numbers with unit amplitude representing for example phase shifts, or symbol rotations. For example, if a burst is transmitted in a frame FN, the burst may be scrambled according to a scrambling value, $C_k(FN \bmod L)$. Or, in case of TDMA based access, if a burst is transmitted in timeslot TN of TDMA frame FN, the burst may be scrambled according to a scrambling value, $C_k((FN*8+TN) \bmod L)$. The scrambling may be performed by for example:

phase shifting with the phase of the scrambling value, or, symbol rotation with rotation angle equal to the phase of the scrambling value.

Further, according to embodiments herein, on a receiver side, such as in the receiving node of the first cell 115, a sequence of received bursts may be de-scrambled according to the scrambling code specific for, and e.g. assigned to, the cell. If a burst is received in timeslot TN of TDMA frame FN, the burst may again be scrambled, but now according to a complex conjugate of the scrambling value, such as $C^*_k((FN*8+TN) \bmod L)$.

Thanks to embodiments herein and cell specific scrambling and descrambling, different scrambling, such as corresponding to different overlaid scrambling codes, may be applied on wanted and interfering signals, e.g. bursts, comprising the information to be communicated. Wanted information or signals, e.g. bursts, may thereby be coherently combined while at the same time interfering signals, e.g. bursts, such as from other cell(s), can be non-coherently combined, whereby impact of the interfering signals is reduced. Consequently, embodiments herein enable improvement of a Signal to Noise Ratio (SNR) compared to if information, e.g. by conventional block repetition, would be repeatedly sent in a conventional manner without the above described scrambling.

Further, implementation complexity of embodiments herein is small. Thus, embodiments herein may be comparatively easily implemented in existing, such as legacy, wireless communication networks, nodes and devices.

Figure 7:
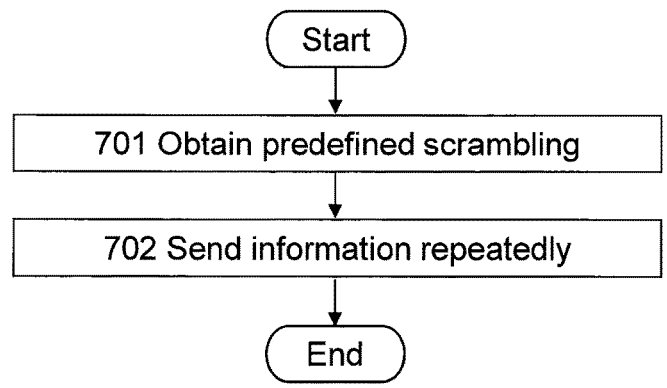
FIG. 7 is a flowchart schematically illustrating embodiments of a method performed in a sending node.

FIG. 7 is a flowchart schematically illustrating embodiments performed by a sending node, e.g. the first wireless device 120 in UL case or the first network node 110 in a DL case, for sending information to a receiving node, e.g. the first network node 110 in a UL case or the first wireless device 120 in a DL case. Said nodes are comprised in a wireless communication network, e.g. the wireless communication network 100, Communication between said nodes is associated with a first cell, e.g. the first cell 115, of the wireless communication network 100.

The method comprises the following actions that may be executed in any suitable order:

Action 701

The sending node obtains predefined scrambling for scrambling the information and which predefined scrambling is specific for the first cell 115.

The predefined scrambling specific for the first cell 115 may comprises a sequence of predefined scrambling values. Each time the information is repeatedly sent it may be scrambled by a scrambling value of the sequence. The scrambling value may be determined by an identifier associated with the information being sent and that is based on one or more of the following: a frame number, a TDMA frame number, a timeslot number of a frame, a timeslot number of a TDMA frame. Further, the sequence of predefined scrambling values may be a pseudo-random sequence.

Said obtained scrambling that is specific for the first cell 115 should be different than corresponding scrambling being specific for another, second cell, e.g. the second cell 116 of the wireless communication network 100, which second cell 116 may cause inter-cell interference in the first cell 115.

This action may fully or partly correspond to Action 601 discussed above in connection with FIG. 6.

Action 702

The sending node sends, to the receiving node, the information repeatedly a certain number of times, wherein each time the information is sent it is scrambled differently based on the obtained scrambling.

The scrambling may provide one or more of the following when the information is being repeatedly sent: different phase shifts, different sample and/or symbol rotations, time variations in transmission time and a change in the order in which samples of the information are sent.

This action may fully or partly correspond to Action 605 discussed above in connection with FIG. 6.

Figure 8:
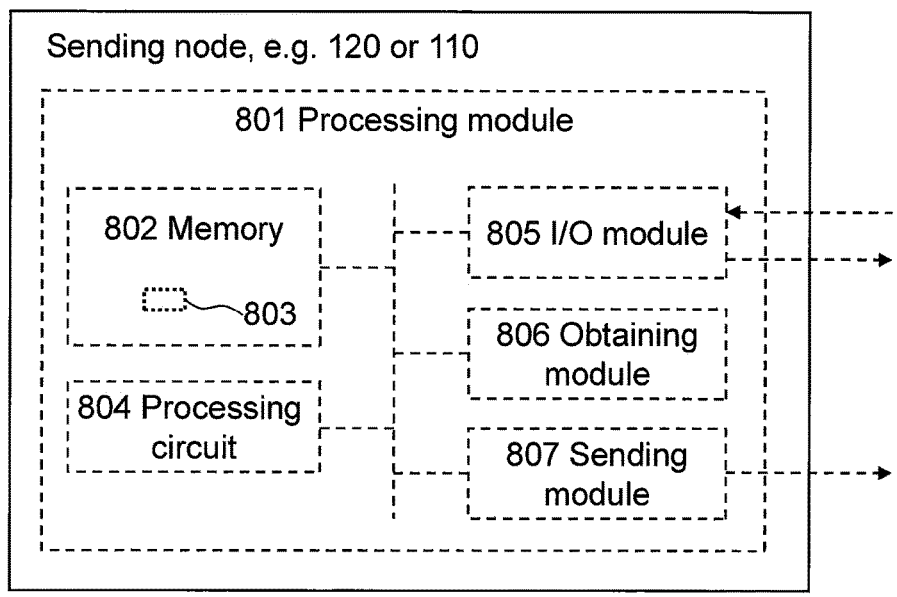
FIG. 8 is a functional block diagram for illustrating embodiments of the sending node.

FIG. 8 is a schematic block diagram for illustrating embodiments of the sending node, in particular how it may be configured to perform the method and/or one or more actions thereof as described herein. The sending node is thus for sending information to the receiving node when the said nodes are comprised in the wireless communication network 100 and communication between said nodes is associated with the first cell 115. The sending node may comprise:

A processing module 801, such as a means, one or more hardware modules, including e.g. one or more processors, and/or one or more software modules for performing said methods and/or actions.

A memory 802 that may comprise, such as contain or store, a computer program 803. The computer program comprises 'instructions' or 'code' directly or indirectly executable by the sending node so that it performs the said methods and/or actions. The memory 802 may comprise one or more memory units and may be further be arranged to store data, such as configurations and/or applications involved in or for performing functions and actions of embodiments herein.

A processing circuit 804 as an exemplifying hardware module and may comprise or correspond to one or more processors. In some embodiments, the processing module 801 may comprise, e.g. 'is embodied in the form of' or 'realized by' the processing circuit 804. In these, embodiments, the memory 802 may comprise the computer program 803 executable by the processing circuit 804, whereby the sending node is operative, or configured, to perform said method and/or actions.

An Input/Output (I/O) module 805, configured to be involved in, e.g. by performing, any communication to and/or from other units and/or nodes, such as sending and/or receiving information to and/or from other external nodes or devices. The I/O module 805 may be exemplified by an, obtaining, e.g. receiving, module and/or a sending module, when applicable.

The sending node may also comprise other exemplifying hardware and/or software module(s) as may have been described elsewhere in the present disclosure, which module(s) may be fully or partly implemented by the processing circuit 804. For example, the sending node may further comprise one or more of the following; an obtaining module 806 and/or a sending module 807.

Hence, the sending node, e.g. the first network node 110 or the first wireless device 120, and/or the processing module 501 and/or the obtaining module 506 may be operative, or configured, to obtain said predefined scrambling, i.e. said scrambling for scrambling the information and which predefined scrambling is specific for the first cell 115.

Moreover, the sending node, e.g. the first network node 110 or the first wireless device 120, and/or the processing module 501 and/or the I/O module 505 and/or the sending module 507 may thus be operative, or configured, to send, to the receiving node, the information repeatedly a certain number of times, wherein each time the information is sent it is scrambled differently based on the obtained scrambling.

Figure 9:
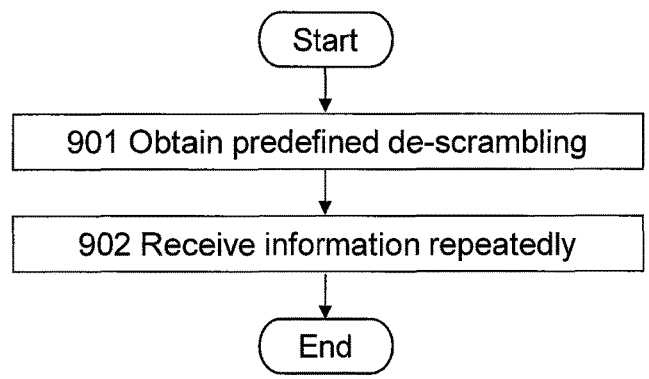
FIG. 9 is a flowchart schematically illustrating embodiments of a method performed in a receiving node.

FIG. 9 is a flowchart schematically illustrating embodiments performed by a receiving node, e.g. the first network node 110 the in a UL case, or the first wireless device 120 in a DL case, for, receiving information from a sending node, e.g. the first wireless device 120 in the UL case, or the first network node 110 in the DL case. Said nodes are comprised in a wireless communication network, e.g. the wireless communication network 100. Communication between said nodes is associated with a first cell, e.g. the first cell 115, of the wireless communication network 100.

The method comprises the following actions that may be executed in any suitable order:

Action 901

The receiving node obtains predefined de-scrambling for de-scrambling the information, and which predefined de-scrambling is specific for the first cell 115.

The de-scrambling specific for the first cell 115 may be based on predetermined scrambling specific for the first cell 115, which scrambling was used for scrambling the received information. The predefined scrambling specific for the first cell 115 may comprise a sequence of predefined scrambling values. Each time the information is repeatedly received, it may have been scrambled by a scrambling value of the sequence. The scrambling value may be determined by an identifier associated with the information being received and that is based on one or more of the following: a frame number, a TDMA frame number, a timeslot number of a frame, a timeslot number of a TDMA frame. Further, the sequence of predefined scrambling values may be a pseudo-random sequence.

Said scrambling that is specific for the first cell 115 should be different than corresponding scrambling being specific for another, second cell, e.g. the second cell 116 of the wireless communication network 100, which second cell 116 may cause inter-cell interference in the first cell 115.

This action may fully or partly correspond to Action 602 discussed above in connection with FIG. 6.

Action 902

The receiving node receives, from the sending node, the information repeatedly a certain number of times, wherein each time the information is received it is de-scrambled differently based on the obtained de-scrambling.

The de-scrambling specific for the first cell 115 is typically based on predetermined scrambling specific for the first 115 cell, such as discussed above, and which scrambling was used for, scrambling the received information.

Scrambling of the information being repeatedly received may have provided one or more of the following: different phase shifts, different sample and/or symbol rotations, time variations in transmission time and a change in the order in which samples of the information are sent.

This action may fully or partly correspond to Action 605 discussed above in connection with FIG. 6.

Figure 10:
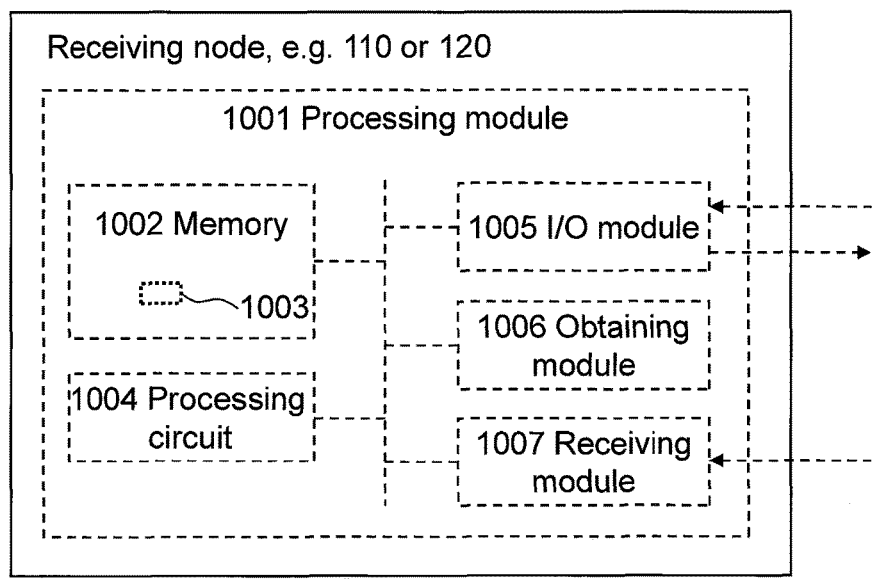
FIG. 10 is a functional block diagram for illustrating embodiments of the receiving node.

FIG. 10 is a schematic block diagram for illustrating embodiments of the receiving node, in particular how it may be configured to perform the method and/or one or more actions thereof as described herein. The receiving node is thus for receiving information from the sending node when the said nodes are comprised in the wireless communication network 100 and communication between said nodes is associated with the first cell 115. Hence, the receiving node may comprise:

A processing module 1001, such as a means, one or more hardware modules, including e.g. one or more processors, and/or one or more software modules for performing said methods and/or actions.

A memory 1002 that may comprise, such as contain or store, a computer program 1003. The computer program comprises 'instructions' or 'code' directly or indirectly executable by the receiving node so that it performs the said methods and/or actions. The memory 1002 may comprise one or more memory units and may be further be arranged to store data, such as configurations and/or applications involved in or for performing functions and actions of embodiments herein.

A processing circuit 1004 as an exemplifying hardware module and may comprise or correspond to one or more processors. In some embodiments, the processing module 1001 may comprise, e.g. 'is embodied in the form of' or 'realized by' the processing circuit 1004. In these embodiments, the memory 1002 may comprise the computer program 1003 executable by the processing circuit 1004, whereby the sending node is operative, or configured, to perform said method and/or actions.

An Input/Output (I/O) module 1005, configured to be involved in, e.g. by performing, any communication to and/or from other units and/or nodes, such as sending and/or receiving information to and/or from other external nodes or devices. The I/O module 1005 may be exemplified by an obtaining, e.g. receiving, module and/or a sending module, when applicable.

The sending node may also comprise other exemplifying hardware and/or software module(s) as may have been described elsewhere in the present disclosure, which module(s) may be fully or partly implemented by the processing circuit 1004. For example, the receiving node may further comprise one or more of the following; an obtaining module 1006 and/or a receiving module 1007.

Hence, the receiving node and/or the processing module 1001 and/or the obtaining module 1006 may be operative, or configured, to obtain said predefined de-scrambling for de-scrambling the information and which predefined de-scrambling is specific for the first cell 115.

Moreover, the receiving node and/or the processing module 1001 and/or the I/O module 1005 and/or the receiving module 1007 may thus be operative, or configured, to receive, from the sending node, the information repeatedly a certain number of times, wherein each time the information is received it is de-scrambled differently based on the obtained de-scrambling.

FIGS. 11a-c are schematic drawings illustrating embodiments relating to a computer program that may be any one of the computer programs 803, 1003 and that comprises instructions that when executed by the processing circuits 804, 1004, respectively and/or the processing modules 801, 1001, respectively, causes the sending node and/or the receiving node to perform as described above.

In some embodiments there is provided a data carrier, e.g. a computer program product, comprising any one or both of the computer programs 803, 1003. The data carrier may be one of an electronic signal, an optical signal, a radio signal, and a computer readable medium. Any one, some or all of the computer programs 803, 1003 may thus be stored on the computer readable medium. By data carrier may be excluded a transitory, propagating signal and the data carrier may correspondingly be named non-transitory data carrier. Non-limiting examples of the data carrier being a computer-readable medium is a memory card or a memory stick 1101 as in FIG. 11a, a disc storage medium 1102 such as a CD or DVD as in FIG. 11b, a mass storage device 1103 as in FIG. 11c. The mass storage device 1103 is typically based on hard drive(s) or Solid State Drive(s) (SSD). The mass storage device 1103 may be such that is used for storing data accessible over a computer network 1104, e.g. the Internet or a Local Area Network (LAN).

Any one, some or all of the computer programs 803, 1103 may furthermore be provided as a pure computer program or comprised in a file or files. The file or files may be stored on the computer-readable medium and e.g. available through download e.g. over the computer network 1104, such as from the mass storage device 1103 via a server. The server may e.g. be a web or File Transfer Protocol (FTP) server. The file or files may e.g. be executable files for direct or indirect download to and execution on the sending node and/or the receiving node, e.g. by any one or both of the processing circuits 804, 1004. The file or files may also or alternatively be for intermediate download and compilation involving the same or another processor to make them executable before further download and execution causing the sending node and/or the receiving node to perform the method(s) as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the sending node and/or the receiving node to be configured to and/or to perform the above-described methods, respectively.

The term "network node" as used herein may as such refer to any type of radio network node (described below) or any network node, which may communicate with at least a radio network node. Examples of such network nodes include any radio network node stated above, a core network node (e.g. MSC, MME, etc.), Operations & Maintenance (O&M), Operations Support Systems (OSS), Self Organizing Network (SON) node, positioning node (e.g. E-SMLC), MDT etc.

The term "radio network node" as used herein may as such refer to any type of network node serving a wireless device, e.g. UE, and/or that are connected to other network node(s) or network element(s) or any radio node from which a wireless device receives signals. Examples of radio network nodes are Node B, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Each of the terms "wireless device", "user equipment" and "UE", as used herein, may as such refer to any type of wireless device arranged to communicate with a radio network node in a wireless, cellular and/or mobile communication system, such as the wireless communication network 100, and may thus be referred to as a wireless communication device. Examples include: target devices, device to device UE, device for MTC, machine type UE or UE capable of machine to machine (M2M) communication, PDA, iPAD, Tablet, mobile terminals, smart phone, laptop embedded equipped (LEE), laptop mounted equipment (LME), USB dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may be used for the sake of simplicity, in order to denote a node which may be a network node, a radio network node or a wireless device, as applicable.

Note that although terminology used herein may be particularly associated with and/or exemplified by certain cellular communication systems, wireless communication networks etc., depending on terminology used, such as wireless communication networks based on 3GPP, this should not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first network node, second network node, first wireless device, second wireless device, etc., as such should be considering non-limiting and the terminology as such does not imply a certain hierarchical relation. Without any explicit information in the contrary, naming by, enumeration should be considered merely away of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may, receive and encode the transmission. In case of group-casting, e.g. multi-casting, a group of specifically addressed devices may receive and decode the transmission.

When using the word "comprise" or "comprising" it shalt be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a sending node, for sending same information to a receiving node in a block of multiple signals repeatedly, said nodes being comprised in a wireless communication network and communication between said nodes being associated with a first cell of the wireless communication network, wherein the method comprises:
   obtaining predefined scrambling comprising a sequence of different predefined scrambling values for scrambling the same information repeatedly in the block of multiple signals and which predefined scrambling is specific for the first cell, and
   sending, to the receiving node, the same information repeatedly a certain number of times in the block of multiple signals, wherein each time the same information is sent in the block of multiple signals it is scrambled differently based on the obtained scrambling;
   wherein each time the same information is repeatedly sent in the block of multiple signals it is scrambled by a different predefined scrambling value of the sequence, and
   wherein the different predefined scrambling value is determined by an identifier associated with the same information being repeatedly sent in the block of multiple signals and that is based on one or more of the following: a frame number, a Time Division Multiple Access, "TDMA" frame number, and a timeslot number of a TDMA frame.

2. The method as claimed in claim 1, wherein the sending node is a wireless device and the receiving node is a network node, or the sending node is a network node and the receiving node is a wireless device.

3. The method as claimed in claim 1, wherein the sequence of different predefined scrambling values is a pseudo-random sequence.

4. The method as claimed in claim 1, wherein the scrambling provides one or more of the following when the same information is being repeatedly sent in the block of multiple signals:
   different phase shifts within the block of multiple signals;
   different sample and/or symbol rotations within the block of multiple signals;
   time variations in transmission time within the block of multiple signals; and
   a change in the order in which samples of the same information are sent within the block of multiple signals.

5. The method as claimed in claim 1, wherein said obtained scrambling that is specific for the first cell is different than corresponding scrambling that is specific for another, second cell of the wireless communication network, which second cell may cause inter-cell interference in the first cell.

6. A computer program product comprising a non-transitory computer readable storage medium storing instructions that when executed by the sending node cause the sending node to perform the method according to claim 1.

7. A method, performed by a receiving node, for receiving same information from a sending node in a block of multiple signals repeatedly, said nodes being comprised in a wireless communication network and communication between said nodes being associated with a first cell of the wireless communication network, wherein the method comprises:
   obtaining predefined de-scrambling for de-scrambling the same information and which predefined de-scrambling is based on predetermined scrambling specific for the first cell, the predefined scrambling specific for the first cell comprises a sequence of different predefined scrambling values, and
   receiving, from the sending node, the same information repeatedly in the block of multiple signals a certain number of times, wherein each time the same information is received in the block of multiple signals it is de-scrambled differently based on the obtained de-scrambling;
   wherein each time the same information is repeatedly received in the block of multiple signals it has been scrambled by a different predefined scrambling value of the sequence, and
   wherein the different predefined scrambling value is determined by an identifier associated with the same information being repeatedly received in the block of multiple signals and that is based on one or more of the following: a frame number, a Time Division Multiple Access, "TDMA" frame number, and a timeslot number of a TDMA frame.

8. The method as claimed in claim 7, wherein the sending node is a wireless device and the receiving node is a network node, or the sending node is a network node and the receiving node is a wireless device.

9. The method as claimed in claim 7, wherein the predetermined scrambling specific for the first cell, was used for scrambling the received same information.

10. The method as claimed in claim 7, wherein the sequence of different predefined scrambling values is a pseudo-random sequence.

11. The method as claimed in claim 9, wherein scrambling of the same information being repeatedly received in the block of multiple signals has provided one or more of the following:
   different phase shifts within the block of multiple signals;
   different sample and/or symbol rotations within the block of multiple signals;
   time variations in transmission time within the block of multiple signals; and a change in the order in which samples of the same information are sent within the block of multiple signals.

12. The method as claimed in claim 9, wherein said scrambling that is specific for the first cell is different than corresponding scrambling that is specific for another, second cell of the wireless communication network, which second cell may cause inter-cell interference in the first cell.

13. A computer program product comprising a non-transitory computer readable storage medium storing instructions that when executed by the receiving node cause the receiving node to perform the method according to claim 7.

14. A sending node for sending same information to a receiving node repeatedly in a block of multiple signals, when said nodes are comprised in a wireless communication network and communication between said nodes is associated with a first cell of the wireless communication network, wherein the first node is configured to:
  obtain predefined scrambling comprising a sequence of different predefined scrambling values for scrambling the same information repeatedly in the block of multiple signals and which predefined scrambling is specific for the first cell, and
  send, to the receiving node, the same information repeatedly in the block of multiple signals a certain number of times, wherein each time the same information is sent in the block of multiple signals it is scrambled differently based on the obtained scrambling;
  wherein each time the same information is repeatedly sent in the block of multiple signals it is scrambled by a different predefined scrambling value of the sequence, and
  wherein the different predefined scrambling value is determined by an identifier associated with the same information being repeatedly sent in the block of multiple signals and that is based on one or more of the following: a frame number, a Time Division Multiple Access, "TDMA" frame number, and a timeslot number of a TDMA frame.

15. The sending node as claimed in claim 14, wherein the sending node is a wireless device and the receiving node is a network node, or the sending node is a network node and the receiving node is a wireless device.

16. The sending node as claimed in claim 14, wherein the sequence of different predefined scrambling values is a pseudo-random sequence.

17. The sending node as claimed in claim 14, wherein the scrambling provides one or more of the following when the same information is being repeatedly sent in the block of multiple signals:
  different phase shifts within the block of multiple signals;
  different sample and/or symbol rotations within the block of multiple signals;
  time variations in transmission time within the block of multiple signals; and
  a change in the order in which samples of the same information are sent within the block of multiple signals.

18. The sending node as claimed in claim 14, wherein said obtained scrambling that is specific for the first cell is different than corresponding scrambling that is specific for another, second cell of the wireless communication network, which second cell may cause inter-cell interference in the first cell.

19. A receiving node for receiving same information repeatedly in a block of multiple signals from a sending node when said nodes are comprised in a wireless communication network and communication between said nodes is associated with a first cell of the wireless communication network, wherein the receiving node is configured to:
  obtain predefined de-scrambling for de-scrambling the same information repeatedly and which predefined de-scrambling is based on predetermined scrambling specific for the first cell, the predefined scrambling specific for the first cell comprises a sequence of different predefined scrambling values, and
  receive, from the sending node, the same information repeatedly in the block of multiple signals a certain number of times, wherein each time the information is received in the block of multiple signals it is de-scrambled differently based on the obtained de-scrambling;
  wherein each time the same information is repeatedly received in the block of multiple signals it has been scrambled by a different predefined scrambling value of the sequence, and
  wherein the different predefined scrambling value is determined by an identifier associated with the same information being received in the block of multiple signals and that is based on one or more of the following: a frame number, a Time Division Multiple Access, "TDMA" frame number, and a timeslot number of a TDMA frame.

20. The receiving node as claimed in claim 19, wherein the sending node is a wireless device and the receiving node is a network node, or the sending node is a network node and the receiving node is a wireless device.

21. The receiving node as claimed in claim 19, wherein the predetermined scrambling was used for scrambling the received same information.

22. The receiving node as claimed in claim 19, wherein the sequence of different predefined scrambling values is a pseudo-random sequence.

23. The receiving node as claimed in claim 19, wherein scrambling of the same information being repeatedly received in the block of multiple signals has provided one or more of the following:
  different phase shifts within the block of multiple signals;
  different sample and/or symbol rotations within the block of multiple signals;
  time variations in transmission time within the block of multiple signals; and
  a change in the order in which samples of the same information are sent within the block of multiple signals.

24. The receiving node as claimed in claim 19, wherein said scrambling that is specific for the first cell is different than corresponding scrambling that is specific for another, second cell of the wireless communication network, which second cell may cause inter-cell interference in the first cell.

* * * * *